(12) United States Patent
Mutalik et al.

(10) Patent No.: US 7,444,420 B1
(45) Date of Patent: *Oct. 28, 2008

(54) APPARATUS AND METHOD FOR MIRRORING AND RESTORING DATA

(75) Inventors: Madhav Mutalik, Southboro, MA (US); John G. Deshayes, Hopkinton, MA (US); Allan Scherr, Framingham, MA (US); Jeff Donovan, Holden, MA (US)

(73) Assignee: EMC Corporation, Hopkinton, MA (US)

( * ) Notice: Subject to any disclaimer, the term of this patent is extended or adjusted under 35 U.S.C. 154(b) by 70 days.

This patent is subject to a terminal disclaimer.

(21) Appl. No.: 11/409,304

(22) Filed: Apr. 21, 2006

Related U.S. Application Data

(63) Continuation of application No. 09/876,492, filed on Jun. 7, 2001, now Pat. No. 7,149,787.

(51) Int. Cl.
*G06F 15/16* (2006.01)

(52) U.S. Cl. .................. 709/231; 709/215; 709/217; 709/219; 711/100; 711/114

(58) Field of Classification Search ............... 709/203, 709/217, 219, 223, 224, 227, 229; 707/204, 707/205; 711/161, 162; 714/6, 7
See application file for complete search history.

(56) References Cited

U.S. PATENT DOCUMENTS

| | | | |
|---|---|---|---|
| 5,742,792 A * | 4/1998 | Yanai et al. ............... 711/162 |
| 5,787,485 A | 7/1998 | Fitzgerald et al. |
| 5,835,953 A * | 11/1998 | Ohran .................... 711/162 |
| 5,845,292 A * | 12/1998 | Bohannon et al. .......... 707/202 |
| 5,901,327 A * | 5/1999 | Ofek ...................... 710/5 |
| 5,987,566 A * | 11/1999 | Vishlitzky et al. .......... 711/114 |
| 6,047,294 A * | 4/2000 | Deshayes et al. .......... 707/204 |
| 6,052,797 A * | 4/2000 | Ofek et al. ................ 714/6 |
| 6,101,497 A * | 8/2000 | Ofek ...................... 707/10 |
| 6,131,148 A * | 10/2000 | West et al. ............... 711/162 |
| 6,141,773 A * | 10/2000 | St. Pierre et al. .......... 714/20 |
| 6,157,991 A | 12/2000 | Arnon |
| 6,173,377 B1 | 1/2001 | Yanal et al. |
| 6,237,008 B1 | 5/2001 | Beal et al. |
| 6,269,381 B1 | 7/2001 | St. Pierre et al. |
| 6,324,654 B1 * | 11/2001 | Wahl et al. ................ 714/6 |
| 6,360,330 B1 | 3/2002 | Mutalik et al. |
| 6,363,462 B1 * | 3/2002 | Bergsten .................. 711/162 |
| 6,397,307 B2 * | 5/2002 | Ohran ..................... 711/161 |
| 6,446,175 B1 | 9/2002 | West et al. |
| 6,490,598 B1 * | 12/2002 | Taylor .................... 707/204 |
| 6,499,091 B1 * | 12/2002 | Bergsten .................. 711/162 |
| 6,502,205 B1 | 12/2002 | Yanai et al. |
| 6,611,923 B1 | 8/2003 | Mutalik et al. |
| 6,625,623 B1 * | 9/2003 | Midgley et al. ............ 707/204 |
| 6,654,752 B2 | 11/2003 | Ofek |

(Continued)

*Primary Examiner*—Lashonda T Jacobs
(74) *Attorney, Agent, or Firm*—Theodore A. Chen; Krishnendu Gupta

(57) ABSTRACT

An apparatus and method for mirroring data is provided wherein integrity of data on a mirror device is maintained during and after a restore process of data to a standard volume. Because integrity of the mirror is maintained, data from the mirror may be used to perform a later restore to the standard volume if data becomes corrupted, or data is unavailable for any other reason. As a result, the mirror may be used for backup or other operations.

35 Claims, 11 Drawing Sheets

U.S. PATENT DOCUMENTS

| | | | |
|---|---|---|---|
| 6,691,245 B1 * | 2/2004 | DeKoning | 714/6 |
| 6,718,352 B1 | 4/2004 | Dang et al. | |
| 6,732,231 B1 | 5/2004 | Don et al. | |
| 6,760,862 B1 * | 7/2004 | Schreiber et al. | 714/15 |
| 6,871,271 B2 * | 3/2005 | Ohran et al. | 711/162 |
| 6,912,629 B1 | 6/2005 | West et al. | |
| 6,912,630 B1 | 6/2005 | Pillai et al. | |
| 6,996,668 B2 * | 2/2006 | Gaertner et al. | 711/113 |
| 2003/0065780 A1 * | 4/2003 | Maurer et al. | 709/225 |
| 2003/0069889 A1 | 4/2003 | Ofek | |

* cited by examiner

| TRACK NUMBER 501 | RESTORED? 502 |
|---|---|
| 1 | Y |
| 2 | Y |
| 3 | N |
| 4 | N |
| 5 | N |
| 6 | N |
| 7 | N |
| 8 | N |
| 9 | N |
| 10 | N |
| 11 | N |
| ... | ... |
| X | N |

TABLE 500

FIGURE 5

APPARATUS AND METHOD FOR MIRRORING AND RESTORING DATA

RELATED APPLICATIONS

This application is a continuation of U.S. application Ser. No. 09/876,492 filed Jun. 7, 2001, now U.S. Pat. No. 7,149,787, which are hereby incorporated by reference in their entirety.

FIELD OF THE INVENTION

The invention relates to data storage for computers, and more particularly to a method and apparatus for mirroring and restoring data.

BACKGROUND OF THE RELATED ART

Storage is widely used for storing data associated with computer systems. Storage may be primary storage used for routinely accessing information, or may be secondary storage providing redundant or archival storage to permit data recovery in the case of loss of data in the primary storage system. Examples of primary storage include systems referred to as "production" or "working" data storage systems. Examples of secondary storage include systems referred to as "backup" systems. Storage may be used, for example, for storing executable program code (commonly referred to as computer "programs" or "applications") and/or data input to and generated by such program code.

Storage of data is conventionally performed by storage systems including one or more storage devices arranged into one or more storage volumes. Storage devices may be, for example, disk devices that store data on one or more types of media, including magnetic, optical, or other type of media used for storing data. More particularly, disk devices may be arranged into one or more data storage areas referred to in the art as "volumes" that are capable of being accessed by one or more computer systems referred to as "hosts." A volume is commonly defined as a virtual storage area into which a file system, database management system, or other system or process places data. A volume may include a single partition of a disk device or multiple partitions located on one or more physical storage devices. Generally, volumes are managed by the storage systems which are computer systems that provide storage-related services to hosts. The hosts communicate with a storage system through a communication medium such as a network. Typical networks used to transfer data between hosts and storage systems include Fibre Channel, SCSI, Ethernet, Gigabit Ethernet, and other types of communication networks. Data is transferred between systems using one or more communication protocols as is well-known in the art.

Many storage systems enable data to be copied from one or more of these storage devices to another device to allow data to be restored in case of failure of a disk device, deletion of data, or other reason. Some storage systems provide the ability to copy data to secondary storage for archival purposes such as backups, while other storage systems maintain copies of data in real time.

This copying of data in real time from one storage area to another is referred to in the art as "mirroring" data. Generally, a standard volume or disk device is defined as the primary storage area for data, and a "mirror volume" or "mirror device" is defined as the secondary storage area. The term "mirror" is used generally hereinafter to refer to a mirror volume or mirror device. A mirror may be a logical construct such as a logical volume comprising an array of one or more disks, or the mirror may be a physical device such as a disk. A mirror is typically used for redundancy, in that a controller of a storage system having a standard volume and a mirror accesses media of either the standard volume or the mirror when a read failure occurs. More particularly, in the case of a read failure caused by a defect on the surface of one of either the standard volume or mirror disk drives, a crash of one of these drives, or other problem, the controller simply reads the intact version of the file from the intact drive. If the read failure is caused by a media defect, the controller can automatically read the data from the copy of the file on the other drive and write it to a new, undamaged area on the drive on which the defect occurred.

For example, a mirror associated with a standard volume is synchronized by the storage system to the standard volume. That is, data residing on the standard volume is copied to the mirror, and updates to data residing on the standard volume are also performed on the mirror. A mirror that is synchronized to a standard volume is said to be in a "mirrored" state. A mirror which is no longer being synchronized with the standard volume is said to be in a "split" state.

Mirrors may also be used to perform backups, reports, and other operations requiring availability of the standard volume. More particularly, because certain operations require locking of data, affect read/write performance, or otherwise affect normal access to the data by hosts, a mirror volume may be used to provide data for these certain operations without affecting performance to the standard volume. Typically, a mirror is first synchronized to the standard volume so that data may be copied to the mirror, and then the mirror is placed in a split state. Thereafter, the mirror functions as a snapshot of the standard volume at the time the mirror was split. The snapshot may be then used to perform a backup, such as to another secondary storage area, reports may be generated based on the data stored in the snapshot, or the snapshot may serve as an operational storage area to offload read requests from standard volumes, data mining operations, and other tasks.

The snapshot may also be used to restore data to the standard volume. For instance, the snapshot may be used to perform a full or an incremental restore of data to the standard volume in the case of data deletion, failure of one or more disk devices of the standard volume, read failure, or other reason.

In any case, data from the snapshot is restored to the standard volume, and the snapshot is resynchronized with the standard volume. Resynchronization of the snapshot to the standard volume involves copying of updated data from the standard volume to the snapshot.

SUMMARY OF THE INVENTION

In accordance with one embodiment of the invention, a method is provided for mirroring data of a first storage area. The method comprises placing a second storage area in a first state wherein updates to the first storage area are made to the second storage area, mirroring data from the first storage area to the second storage area, changing a state of the second storage area from the first state to a second state in which updates to the first storage area are not made to the second storage area, and restoring data to the first storage area from the second storage area while maintaining the second storage area in the second state. According to another embodiment of the invention, the method further comprises writing, only to the first storage area, any data received during the act of restoring. According to another embodiment of the invention, the method further comprises maintaining, after the act of restoring is complete, the second storage area in the second state. According to another embodiment of the invention, the method further comprises receiving a read request issued by a host, and reading, during the act of restoring, data from the second storage area in response to the read request if the data has not been restored to the first storage area.

In accordance with one embodiment of the invention, a method is provided wherein the act of changing further comprises allowing the second storage area to be accessed independently from the first storage area. According to another embodiment of the invention, the method further comprises performing an incremental restore of data from the second storage area to the first storage area. According to another embodiment of the invention, the act of restoring includes performing a full restore of data from the second storage area to the first storage area. According to another embodiment of the invention, the method further comprises assigning an address to the second storage area, the second storage area being capable of being accessed through the address independently from an address of the first storage area. According to another embodiment of the invention, the first storage area and second storage area are respectively located on first and second logical volumes of a storage system.

In accordance with another embodiment of the invention, the method further comprises indicating whether data has been restored to the first storage area to the second storage area. In accordance with another embodiment of the invention, the method further comprises restoring data read from the second storage area to the first storage area. In accordance with another embodiment of the invention, at least one of the placing, mirroring, changing, and restoring acts is initiated by a command issued at a host computer. In accordance with another embodiment of the invention, the second storage area contains a snapshot of data of the first storage area, and wherein the method further comprises updating, after the restoring act is complete, data within the first storage area such that the updated data within the first storage area is different from the snapshot of data, and restoring, from the second storage area, the snapshot data to replace the updated data within the first storage area.

In accordance with another embodiment of the invention, a storage system is provided comprising a first storage area, a second storage area, and at least one controller that places the second storage area mirrors data from the first storage area to the second storage area, changes a state of the second storage area from the first state to a second state in which updates to the first storage area are not made to the second storage area, and restores data to the first storage area from the second storage area while maintaining the second storage area in the second state. According to another embodiment of the invention the controller writes, only to the first storage area, any data received during restoring of data to the first storage area. According to another embodiment of the invention, the controller maintains, after restoring of data to the first storage area is complete, the second storage area in the second state. According to another embodiment of the invention, the controller receives, at the storage system, a read request issued by a host, and reads, during restoring of data to the first storage area, data from one of the first and second storage areas in response to the read request. According to another embodiment of the invention, the controller allows the second storage area to be accessed independently from the first storage area.

According to another embodiment of the invention, the controller performs an incremental restore of data from the second storage area to the first storage area. According to another embodiment of the invention, the controller performs a full restore of data from the second storage area to the first storage area. According to another embodiment of the invention, the controller assigns an address to a disk device associated with the second storage area, the second storage area being capable of being accessed through the address independently from an address of the first storage area.

According to another embodiment of the invention, the controller includes means for placing the second storage area in the first state, means for mirroring data from the first storage area to the second storage area, means for changing the state of the second storage area from the first state to the second state, and means for restoring data to the first storage area from the second storage area while maintaining the second storage area in the second state.

In accordance with a further embodiment of the invention, a computer readable medium is provided which is encoded with a computer program that, when executed on a computer system, causes the computer system to perform a method comprising acts of placing a second storage area in a first state wherein updates to the first storage area are made to the second storage area, mirroring data from the first storage area to the second storage area, changing a state of the second storage area from the first state to a second state in which updates to the first storage area are not made to the second storage area, and restoring data to the first storage area from the second storage area while maintaining the second storage area in the second state. According to another embodiment of the invention, the computer program is further adapted to cause the computer to perform writing, only to the first storage area, any data received during the act of restoring.

According to another embodiment of the invention, the computer program is further adapted to cause the computer to perform maintaining, after the act of restoring is complete, the second storage area in the second state. According to another embodiment of the invention, the computer program is further adapted to cause the computer to perform receiving, at the storage system, a read request issued by a host, and reading, during the act of restoring, data from the second storage area in response to the read request if the data has not been restored to the first storage area. According to another embodiment of the invention, the act of changing further comprises allowing the second storage area to be accessed independently from the first storage area. According to another embodiment of the invention, the act of restoring includes performing an incremental restore of data from the second storage area to the first storage area.

According to another embodiment of the invention, the act of restoring includes performing a full restore of data from the second storage area to the first storage area. According to another embodiment of the invention, the computer program is further adapted to cause the computer to perform assigning an address to the second storage area, the second storage area being capable of being accessed through the address independently from an address of the first storage area. According to another embodiment of the invention, the first storage area and second storage area are respectively located on first and second logical volumes of a storage system. According to another embodiment of the invention, the computer program is further adapted to cause the computer to perform indicating whether data has been restored to the first storage area from the second storage area.

According to another embodiment of the invention, the computer program is further adapted to cause the computer to perform restoring data read from the second storage area to the first storage area. According to another embodiment of the invention, at least one of the placing, mirroring, changing, and restoring acts is initiated by a command issued at a host computer. According to another embodiment of the invention, the computer program is further adapted to cause the computer to perform updating after the restoring act is complete, data within the first storage area, restoring, from the second storage area, data to replace the updated data within the first storage area.

Further features and advantages of the present invention as well as the structure and operation of various embodiments of the present invention are described in detail below with reference to the accompanying drawings. In the drawings, like reference numerals indicate like or functionally similar elements. Additionally, the left-most one or two digits of a reference numeral identifies the drawing in which the reference numeral first appears.

BRIEF DESCRIPTION OF THE DRAWINGS

In the drawings,

FIG. 5 shows a table for tracking restored data in accordance with one embodiment of the invention;

DETAILED DESCRIPTION

When a storage device is placed in a mirrored state with a storage device of a standard volume, the state of data on the storage device of the mirror is synchronized with that of the standard volume. If the standard volume becomes corrupted, or data on a storage device of the standard volume is not available for any other reason, data may be restored from the split volume. A restore operation typically involves not only copying information from the mirror to the standard volume, but also a resynchronization whereby any updates of the standard volume are passed to the mirror, such that any writes received while the restore is in progress are generally performed to both the mirror and the standard volume. If a corrupting write is made, the corrupting write is performed to both the mirror and standard volume, and therefore the capability of recovering uncorrupted data is lost.

According to one embodiment of the invention, while the restore of data from the mirror to the standard volume is ongoing, updates to the standard volume are not passed to the mirror so that integrity of the mirror is retained. In a further embodiment, after the restore of data is complete, the mirror assumes a split state, rather than a synchronized (or established) state as in a conventional mirror operation. Because writes are performed to the standard volume and not the mirror, the integrity of data stored on the mirror is maintained. Thus, the mirror may be used again to perform another restore, or be put into operation for reading data. Also, the mirror is not susceptible to a corrupting write performed during or after the restore operation.

An apparatus and method for mirroring data is provided wherein integrity of data on a mirror device is maintained during a restore process of data to a standard volume. Because integrity of the mirror is maintained, data from the mirror may be used to perform a later restore to the standard volume if data becomes corrupted, data is unavailable for any other reason, for backup, or any other purpose.

The method may be implemented in any storage system capable of controlling read and write operations to standard and mirror volumes. The storage system may be a general-purpose computer system, or may include specialized software and/or hardware to perform storage and management of data. The aspects of the present invention are not limited to use with any particular storage system.

Figure 1:
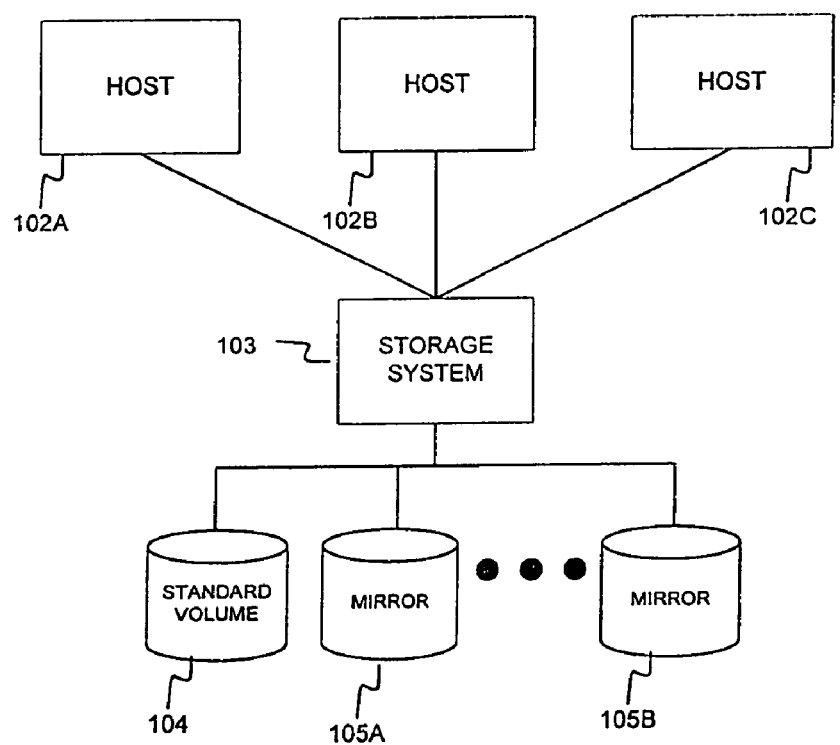
FIG. 1 shows an illustrative system on which various embodiments of the invention may be implemented.

FIG. 1 shows one example of a system suitable for implementing various embodiments of the invention. The system includes a storage system 103 that stores data to both a standard volume 104 and one or more mirrors 105A-105B. It should be appreciated that any number of mirrors may be associated with a standard volume. Storage system 103, upon receiving requests from one or more hosts 102A-102C, performs split and restore operations with respect to data located on standard volume 104 and/or mirrors 105A-105C.

For example, a user may create a mirror of standard volume 104. The mirror is then split from the standard volume 104, such that no updates to the mirror occur. The mirror may later be used to perform a restore operation to standard volume 104. More particularly, storage system 103 may perform a restore of data from mirror 105A to standard volume 104 upon a request initiated by host 102A. Storage system 103 may also perform other operations, such as splitting one or more mirrors 105A-105B from standard volume 104, resynchronizing mirror 105A to the standard volume 104, or any other type of operation involving data located on any of volumes 104-105.

It should be appreciated that mirror and standard volumes may be located in and controlled by separate systems, or may be located within and controlled by the same storage system 103. Data may be located in same or different systems, systems may be physically within the same physical enclosure, or may be located in different physical enclosures connected by one or more communication links. It should also be appreciated that one or more physical storage devices (e.g., disk drives) may be used to create a volume, and that mirror operations may involve copying between sets of storage devices. Other configurations of a storage system are possible that are within the spirit and scope of the invention. For example, although FIG. 1 shows volumes including one or more disks, it should be appreciated that any storage device may be used.

An example of a storage system on which aspects of the present invention may be implemented is the Symmetrix line of storage systems available from the EMC Corporation, Hopkinton, Mass. Storage system 201 of FIG. 2 corresponds to the general architecture of a Symmetrix storage system. Again, this architecture is shown by way of example only, as it should be appreciated that embodiments of the invention described below can be implemented on numerous other architectures.

Figure 2:
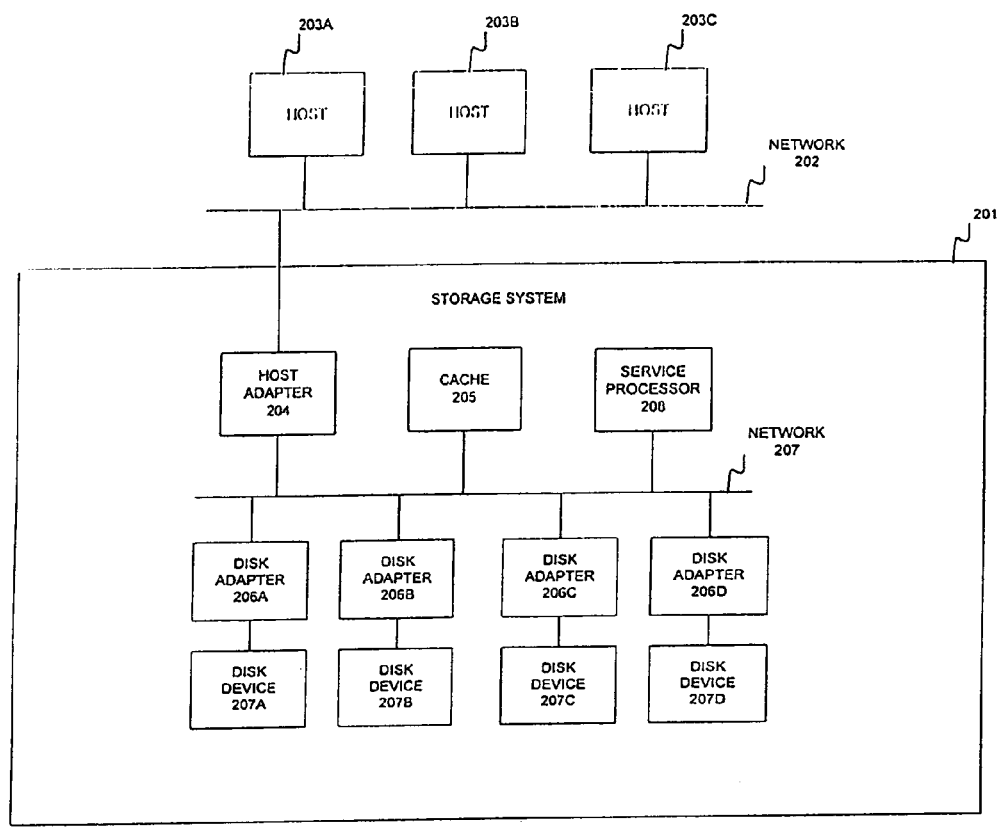
FIG. 2 shows an example storage system on which various embodiments of the invention may be implemented.

FIG. 2 shows a storage system 201, coupled to a communication network 202, that is capable of providing storage services to one or more hosts 203A-203C. Hosts 203A-203C may be, for example, general-purpose computer systems as in known in the art. While three hosts are shown, there may be any number of hosts that are serviced by system 201.

A general-purpose computer system may include a processor connected to one or more storage devices. Devices of a general-purpose computer system may be coupled by a communication device such as bus. A general-purpose computer system also generally includes one or more output devices, such as a monitor or graphic display, or printing device. Further, the general-purpose computer system typically includes a memory for storing programs and data during operation of the computer system. In addition, the general-purpose computer system may contain one or more communication devices that connect the computer system to communication network 202. This communication device may be, for example, an adapter that converts timing and protocol of one communication network to another. For example, communication device may be a host bus adapter (HBA) that is installed in a host and permits the host to communicate with storage system 201.

As is known in the art, a general-purpose computer system is programmable using a high-level computer programming language. A general-purpose computer system may also be implemented using specially programmed, special purpose hardware. In such a computer system, a processor is provided which is typically a commercially available processor such as an Intel PENTIUM-type processor, AMD Athlon, AMD Duron, Motorola PowerPC, Sun Ultra SPARC, Hewlett-Packard PA-RISC processors, or any other type of processor. Many other processors are available from a variety of manufacturers. Such a processor usually executes an operating system which may be, for example, the Windows 95, Windows 98, Windows NT or Windows 2000 (Windows ME) operating systems available from the Microsoft Corporation, MAC OS System X available from Apple Computer, the Solaris Operating System available from Sun Microsystems, or UNIX available from various sources. Many other operating systems may be used, and the invention is not limited to any particular implementation.

Various aspects of the invention may be implemented in storage system 201, hosts 102, or a combination thereof. For example, various aspects of the invention may be programmed in a programming language (e.g., C, C++, or other language) and executed by one or more processors of any host 203A-C, storage system 201, or combination thereof. Backup and restore operations may be initiated by one or more hosts 203A-C or any other system, and a processor of storage system 201 may initiate commands to perform these operations. For example, various aspects of the invention may be implemented in hardware and/or software of storage system 201. As discussed, storage system 201 may be a general-purpose computer system or specialized software and/or hardware used to perform storage of data. Various aspects of the invention may be programmed in a software programming language to be executed on the general-purpose or specialized computer system.

Various embodiments of the present invention may be programmed using an object-oriented programming language, such as SmallTalk, JAVA, or C++ as is known in the art. Other programming languages also can be used. Alternatively, functional programming may be used. Also, the invention is not limited to being implemented in software; microcode or dedicated hardware may be used. It should also be appreciated that various aspects of the invention may be performed in a distributed manner. For example, various aspects of the invention may be performed by one or more computers coupled to communications network 202 in conjunction with storage system 201.

It should be understood that the invention is not limited to a particular computer system platform, processor, operating system, or network. Also, it should be apparent to those skilled in the art that the present invention is not limited to a specific programming language or computer system and that any appropriate programming languages and computer systems could also be used.

Network 202 may be any communication channel used to communicate information between systems. For example, network 202 may be a Small Computer System Interface ("SCSI"), Enterprise System Connection Architecture ("ESCON"), SCSI-2, Fibre Channel, Gigabit Ethernet, or any other type of communication channel. It should be appreciated that network 202 may be any type of network used to transfer control information and data between a host 203A-203C and storage system 201, and that storage system 201 may be coupled to more than one network 202.

Within storage system 201 is a controller such as host adapter 204 which manages and translates read and write requests from one or more host computers 203A-203C into one or more requests that determine how data is stored or retrieved from disk devices 207A-207D. These read and write requests are transmitted and received over network 202 using a communication protocol as known in the art. For example, the communication protocol may be the SCSI, SCSI-2, TCP/IP, Fibre Channel or other communication protocol. Host adapter 204 may be implemented in any number of ways, including using a general-purpose processor, custom hardware, or combination. Also, it should be appreciated that system 201 can have more than one host adapter 204 to provide additional I/O channels for storage system 201.

Host adapter 204 communicates with other components of storage system 201 using network 207. Network 207 may be, for example, a bus or any other communication channel, including SCSI, SCSI-2, ESCON, Gigabit Ethernet, or any other type of network. Also, there may be more than one network 207 within storage system 201. For example, multiple networks connecting one or more components of system 201 in parallel may be provided. Network 207 may also include passive or active communication equipment, media, or a combination thereof. Other configurations may also be used.

Access to disk devices 207A-207D is controlled through the use of controllers known as disk adapters 206A-206D. Disk adapters 206A-206D can also be implemented using a general-purpose processor or a custom hardware design. In the embodiment illustrated in FIG. 2, a disk adapter is provided for each disk device. A disk adapter can, of course, have more than one storage device attached to it. In addition, disk adapters may include secondary connections to physical storage devices of another disk adapter. Secondary connections permit recovery from failure of one disk adapter by shifting its functions to the second disk adapter.

In the embodiment shown in FIG. 2, reading and writing to disk device 207A-207D through disk adapters 206A-206D is facilitated through use of a cache 205. Cache 205 may be, for example, a random access memory having greater speed than disk devices 207A-207D. When reading data, if the data is temporarily stored in the cache 205, the read request can be fulfilled more quickly by taking data from cache 205. Similarly, when writing data, the data to be written can be stored in cache 205.

Storage system 201 also includes a service processor 208 coupled to network 207. Service processor 208 may have an associated display, keyboard and other I/O devices to permit an operator to use service processor 208 for configuring components of storage system 201 and for running or initiating diagnostic and maintenance facilities.

One or more of disk devices 207A-207D may be configured as one or more standard volumes 104, and one or more mirrors 105A-105B. For example, disk device 207A may be configured as standard volume 104 and disk devices 207B-207D may be configured as mirrors of disk device 207A. Other configurations may be used. Volumes do not need to have a one-to-one correspondence with disks. For example, a disk may be configured with two volumes, one being a standard volume and the other being a mirror of the standard volume.

In the shown configuration, data is synchronized between disk device 207A and devices 207B-207D. More particularly, when host adapter 204 receives a write request from a host to the standard volume supported by disk device 207A, host adapter 204 issues a write command to disk devices 207A-207D to perform writes on each of the individual disk devices 207A-207D, respectively. Similarly, when a host issues a request to read data from the standard volume, host adapter 204 may issue read requests to one or more disk devices 207A-207D to read the requested data. To increase read response, host adapter 204 may issue multiple read requests to read different portions of the requested data from different disk devices. In this manner, parallel access to multiple mirrored disk devices increases read performance as is well-known in the art.

As discussed above, a mirror may be split from the standard volume for performing backups, reports, and other operations requiring availability of the data within the standard volume. One technique for performing such mirroring is referred to in the art as a Business Continuation Volume (BCV) available from the EMC Corporation, Hopkinton, Mass. A BCV is a mirror image of a standard volume that can be split from the standard volume without impacting performance of the standard volume. In particular, a BCV can be used to run tasks that otherwise cannot be performed without impacting availability of the standard volume. Because information may be accessed from a BCV and its corresponding standard volume in parallel, multiple operations involving the stored data may be performed at the same time. Once a BCV device is established as a mirror of a standard device, the two devices are referred to collectively as a BCV pair. The pair includes two types of devices: the standard volume and the BCV mirror. Once operations involving data stored on the BCV are complete, the mirror may be resynchronized with the standard volume, reassigned to another standard volume, or maintained in its split state to be used for another task.

A BCV device, when mirrored to a standard volume, is typically not independently addressable. However, when the BCV is split from the standard volume, it is assigned an independent address allowing the BCV to be accessed by one or more systems or processes. These systems or processes, may be, for example, a reporting process executed on a host 203 which analyzes data stored on the BCV.

When the storage system 201 is the Symmetrix storage system, and one or more of disk devices 207B-207D are configured as BCVs, the storage system may also include an application programming interface (API) which allows application developers to access Symmetrix storage system configuration, status, performance, control data, and other Symmetrix storage system features. This API is referred to in the art as the SymmAPI-Control application programming interface which is a C programming interface between a Symmetrix storage system and a host. This interface is well-known in the art of storage programming. In an IBM MVS host environment, for example, the SymmAPI-Control API is a set of MVS-compatible software routines provided on the host that may be accessed and executed by a user or programmer to configure and manage Symmetrix storage systems.

A product referred to in the art as the EMC TimeFinder software system, available from the EMC Corporation, is a combination of host software and Symmetrix storage system microcode which allows users operating a host to alter an operation state of a BCV and to control the sequence in which these state alterations occur. The host software and microcode components also provide the ability to invoke user-written processes to control the usage of BCVs. The EMC TimeFinder system is integrated with the SymmAPI-control API to control operations associated with BCVs.

More particularly, the TimeFinder system provides host management utilities to control the creation of a BCV pair (e.g., a BCV device and a device of a standard volume) and the synchronization of data between devices of the BCV pair. The TimeFinder system provides command line utilities available on a number of systems including MVS, UNIX, and Windows NT host operating systems. Standard management utilities included with the TimeFinder software system include a command utilities line interface (CLI) for the UNIX and NT operating systems and an MVS batch utility for monitoring and executing TimeFinder operations as part of a batch job on an MVS host. The host may also include a graphical user interface (GUI) to define BCV pairs. It should be appreciated that any system for configuring and managing mirrors may be used, and the invention is not limited to this particular implementation.

The EMC TimeFinder system allows a user to create BCVs and to control BCV operations using host commands. More particularly, the EMC TimeFinder software system allows a user to establish a BCV, and split it from a standard volume to make the BCV available to a host or other system. After data operations using BCV data are complete, the BCV device may be resynchronized (also referred to as re-established) with the standard volume. Typical BCV operations include establish, split, re-establish, restore, incrementally restore, and query.

Host commands provided by the EMC TimeFinder system that allow a user to create and control BCV operations include the well-known ESTABLISH, RE-ESTABLISH, SPLIT, RESTORE, CONFIG, QUERY, VERIFY, and SETUP commands.

The ESTABLISH command assigns the BCV as the next available mirror of a standard Symmetrix volume and copies the entire contents of the standard volume to the BCV. The BCV device address remains unavailable to any host while the device remains in an "established" state.

The RE-ESTABLISH command synchronizes a previously suspended standard/BCV pair and makes the BCV "not ready" to the host. Only the data changed on the standard device is copied to the BCV.

The SPLIT command splits a previously-specified BCV pair and returns the standard volume to normal operation. The BCV then becomes available to any host through an independent address assigned to the BCV. To ensure that the split pair contains an updated and consistent copy at the time of termination, the storage system confirms that synchronization is completed between the standard and BCV mirror prior to completing the split. The host can resume operation with the standard Symmetrix volume after completing the split operation.

The RESTORE command assigns the BCV as the next available mirror of a standard Symmetrix volume and copies the entire contents of the BCV to the standard volume. The BCV address remains unavailable to any host while the device remains in a "restored" state. While in the "restored" state, the BCV is an active mirror of the standard volume, and updates to the standard volume are copied to the mirror.

The CONFIG command specifies a number of conditions that determine an operating state of the BCV, including HOLD, RELEASE, NR, and READY conditions for a BCV device. The HOLD parameter enables a BCV to be reserved at split time to prevent the BCV from being used for other commands; the state in which a BCV is placed using the HOLD command is referred to as a "hold" state. There are two ways for placing a BCV in hold state: perform a SPLIT command or issue a HOLD command to any dataset or BCV. The RELEASE parameter puts a BCV back into an "available" state. The available state is a state in which commands may be performed on the BCV, such as commands executed at a host. The NR parameter sets a specified BCV to a "not ready" state, indicating that the BCV is not available for performing commands. The READY parameter sets the specified BCV to a "ready" state which indicates that the BCV is available for performing commands.

The QUERY command reports the status of all BCV devices, including the device availability status and the corresponding standard device. This command returns device records for each BCV device defined in the Symmetrix storage system, including BCV device number, standard device number (for established BCV pairs), BCV availability status, and other state information related to the standard volume and BCV.

The VERIFY command confirms the completion of the BCV synchronization process. A display such as the graphical user interface discussed above shows the BCV device number, standard volume number, invalid track count for BCV and standard mirrors, and synchronization percentage.

The SETUP command reports device types and sizes, and matches a serial number of a Symmetrix device with its host device number. The SETUP command is typically executed on initial setup of the BCV or when a user makes configuration changes to the host or Symmetrix storage system units. This command is generally executed prior to executing the ESTABLISH or RESTORE commands.

To establish a BCV pair (e.g., a BCV device and a device of a standard volume, also referred to as the "standard device"), a user executing an ESTABLISH command on a host assigns the BCV as a next available mirror of a standard Symmetrix device and copies the contents of the standard device to the BCV device. Initially, the BCV device contains no data.

By splitting a BCV pair using the SPLIT command, a nost may execute data operations with the BCV device in an independent manner separate from operation of the standard device. The process of splitting includes reassigning the BCV mirror to its original host address and, therefore, allows the BCV device to be accessed by a host independently of the standard volume. More particularly, by splitting the BCV from a standard Symmetrix volume, the BCV gains a separate address and becomes available to a host system. The standard device mirrors remain unaffected by the split and continue to operate without interruption. The BCV device contains a copy of the data from the standard device as of the point in time when the split command was issued.

To re-establish or resynchronize a BCV pair using the RE-ESTABLISH command, the storage system refreshes the BCV with updates performed on the standard device and discards updates on the BCV that occurred while the two devices were separated. A user may wish to resynchronize a BCV pair to create a snapshot later in time.

To restore a BCV, the BCV is assigned as a next available mirror of a standard Symmetrix volume and the contents of the BCV are copied to the standard volume. If there are any mirrors of the standard device, these mirrors will be updated with copies of the data from the BCV as well. To perform an incremental restore of data of a BCV using the RESTORE command, the storage system copies updates performed on the BCV device to the standard device. Updates performed on the standard device that occurred while the two were separated are discarded. If no updates were performed on the BCV device, this process may be used to roll back a standard device to a known state.

When BCVs are split to capture a snapshot image of a disk, a stable copy is left on the BCV, and the standard volume continues as the production or "live" copy. Sometimes, there is a need to restore the data from the BCV, because the live copy is corrupted or for some other reason. In this situation, an incremental or full restore operation is performed. In a restore operation, the data from the BCV is used to overwrite the data from the standard volume, either for all tracks (full restore), or for just the tracks known to be different between the two volumes (incremental restore).

In either case, as soon as the restore operation is initiated, the restored data becomes available, because even while tracks are being copied in the background, any yet-to-be copied ("unrecovered") tracks can be fetched directly from the BCV rather than the standard volume to satisfy read requests. While the restore is in progress, and even after it completes, write requests are written to both the standard volume and the BCV.

Applicants have appreciated that writing to both the standard volume and the BCV can create problems in certain situations. For example, if after performing a restore, a corrupting write is made, the corrupting write affects both the standard volume as well as the BCV. Thus, there would no longer be a stable snapshot to rely upon to restore the standard volume to a valid state.

According to one embodiment of the invention, a method for performing a safe restore is provided that keeps a mirror such as a BCV secure by performing write operations to only the standard volume, and not to the BCV. As a result, if a corrupting write is performed during or after the restore, data may be recovered from the BCV. In one embodiment of the invention, safe restores can be performed from the mirror to the standard volume in full and/or incremental manners similar to conventional restores.

In another embodiment, the restored data may be made available immediately as soon as the restore operation is initiated. Thus, read operations may be satisfied from the mirror, if the track has not yet been copied. Write operations are different. More particularly, write operations are performed only to the standard volume and not the mirror. In one embodiment, write operations to tracks not restored from the mirror cause the write to be written to the standard volume, and then the track is marked as not to be copied from the mirror, even if it were a full safe restore. That is, writes performed to the standard volume are not performed to the mirror, and, according to one embodiment of the invention, an indication is provided that prohibits restore of information to the standard volume from the mirror to not overwrite any data written to the standard volume during the restore operation.

In one embodiment, after the safe restore is completed, such as by completing a background copy of tracks from the mirror to the standard device, the mirror assumes a split state, rather than the established state unlike the conventional restore operation. As a result, updates received after the restore operation are not made to the BCV. This allows the BCV to remain available for further restores or other operations.

An advantage of the safe restore according to various embodiments of the invention is that data can be restored, while still preserving the snapshot located on the mirror to be used later to perform another normal or safe restore, or if desired, any other desired operation.

Figure 3:
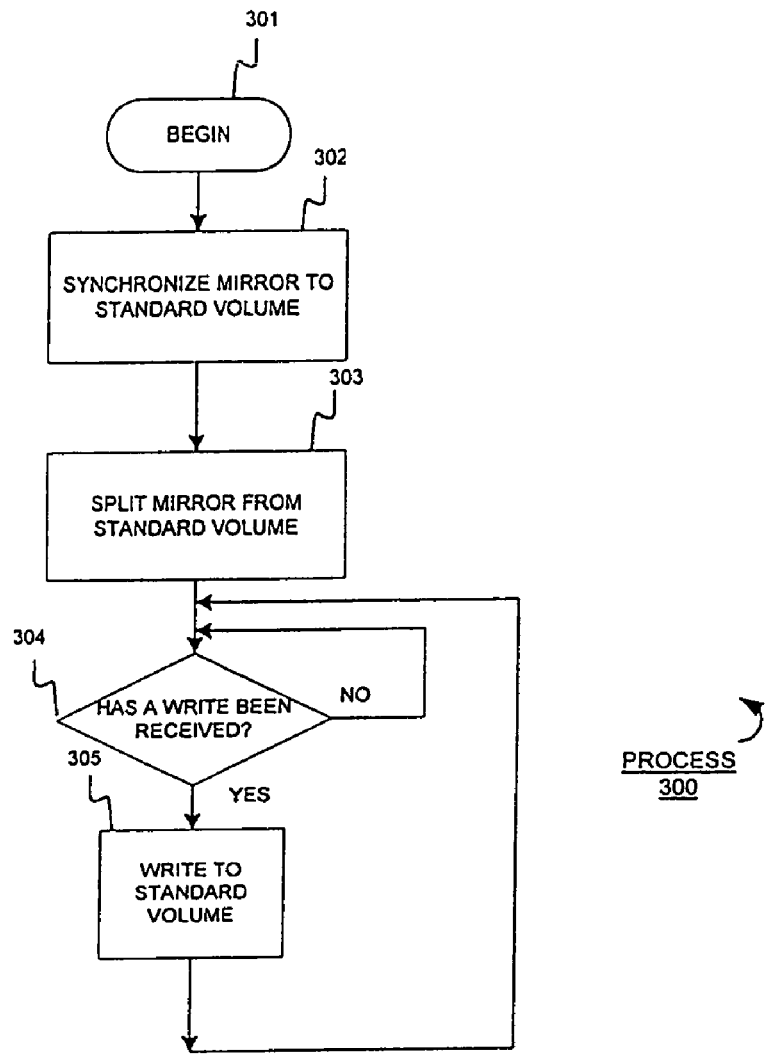
FIG. 3 shows a process for performing a safe restore of data in accordance with one embodiment of the invention.

FIG. 3 shows an illustrative process for mirroring data. More particularly, at block 301, process 300 begins. At block 302, the storage system (e.g., storage system 201 shown in FIG. 2) synchronizes one or more devices associated with a mirror to one or more devices associated with a standard volume. As discussed above, this mirror may be, for example, a BCV. However, the invention is not limited to using a BCV; any mirror may be used. At block 303, the storage system splits the mirror from the standard volume. This splitting may be performed, for example, by executing at a host, a command which causes host adapter 204 to cease mirroring operations from a device associated with a standard volume to a device associated with the mirror volume, or in any other suitable way. Storage system 201 may, after the mirror is split from the standard volume, receive further write requests directed to the standard volume. For instance, if, at block 304 it is determined that a write request has been received, storage system 305 will write data associated with the write request to the standard volume, but not to the mirror. In this manner, the integrity of the mirror is maintained. Writes received after the initiation of a split command are performed to the standard volume and not the mirror device.

Figure 4:
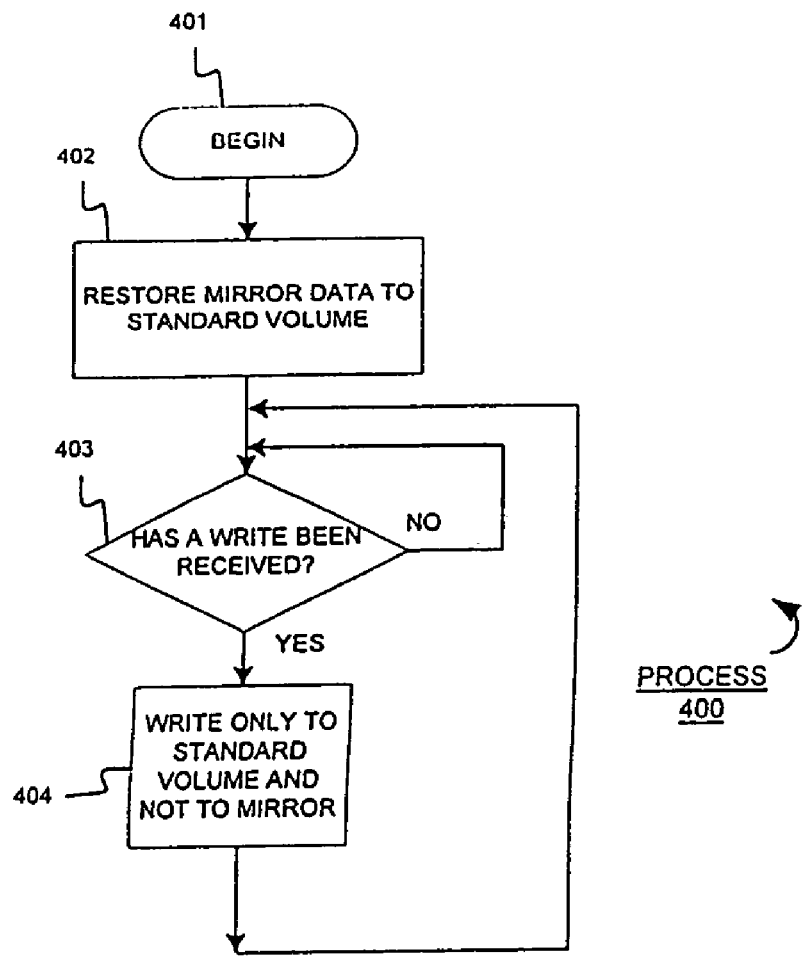
FIG. 4 shows a process for performing a safe restore of data in accordance with another embodiment of the invention.

FIG. 4 shows a process for performing a safe restore of data from a mirror in accordance with another embodiment of the invention. More particularly, a restore process 400 begins at block 401. A restore operation may be initiated, for example, by a user, process, or system executing a command that initiates a safe restore similar to executing a conventional restore as discussed above. At block 402, data stored on a split mirror is restored to the standard volume. As discussed above, this restore may be a full, incremental, or other type of restore operation wherein data is transferred from the mirror to the standard volume. If, at block 403, it is determined that a write request has been received, data is written to the standard volume in accordance with the write request at block 404 directed to the standard volume. In the embodiment shown, the write request is executed only on the standard volume and not the mirror. Because the integrity of data is maintained during and/or after the restore operation is complete, the mirror may be used to perform other operations including later restores, the running of reports, or other operations as discussed above.

FIG. 5 shows an example of a table for tracking data restore to the standard volume in accordance with one embodiment of the invention. This table 500 may be stored anywhere in the computer system that is accessible to the storage system 201. For example, the table may be stored in a cache 205 within the storage system 201, a memory associated with host adapter 204, or any other memory device accessible to storage system 201. It should be appreciated that any method for storing state information may be used. Table 500 includes track numbers 501 which identify tracks of a BCV storage device such as a disk. RESTORED? column 502 indicates, for each track of the BCV, whether the track has been restored from the BCV to the standard volume.

For example, for track number 2 of a BCV device, table 500 may store an associated state value which indicates whether or not the track has been restored to the standard volume. The state information may be any state indication used to relate a restore state of the track including a single bit, a Y/N character, or other state indication. Further, table 500 may be combined with any other table or database associated with storage system 201. It should be appreciated that any granularity of data can be used, and that the invention is not limited to identifying restored data on a track level.

Figure 6:
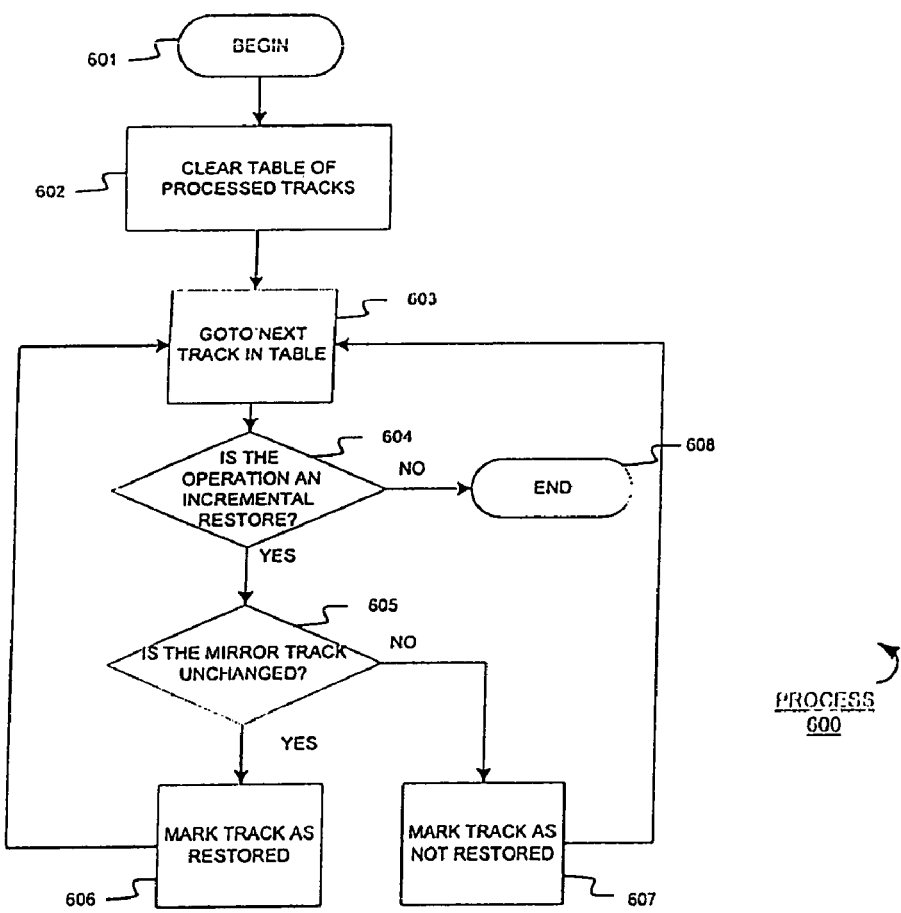
FIG. 6 shows a process for identifying data to be incrementally restored in accordance with one embodiment of the invention.

FIG. 6 shows a process for identifying data to be incrementally restored in accordance with one embodiment of the invention. More particularly, process 600 shows a method for starting a safe restore operation. At block 601, process 600 begins. At block 602, the process clears a table storing the state of processed tracks. For example, this table may be a table as described above with reference to FIG. 5. At block 603, the process inspects the next track in the table. At block 604, it is determined whether the operation being performed is an incremental safe restore in accordance with one embodiment of the invention. If not, process 600 ends at block 608. Process may then proceed, for example, to perform the associated received operation. If the operation is a safe incremental restore, the process determines whether the track information is unchanged over that which is stored in the standard volume. If the mirror track is unchanged, the track does not need to be restored to the standard volume, and the track is marked as being restored in the table at block 606. If the mirror track has changed, the track is marked as not being restored in the table at block 607. In this manner, a table or other data set may be constructed indicating which information needs to be transferred from the mirror to the standard volume for the incremental restore. It should be understood that process 600 may be performed in conjunction with transferring data from the standard volume to the BCV or vice-versa.

In some storage systems in which various aspects of the invention may be practiced, there may be read-locks and/or write-locks used to protect a storage area from simultaneous updates by more than one entity such as a host or process. A read-lock is a lock which allows multiple systems or processes to read information in the storage area with which the lock is associated, but the lock does not allow the information to be updated. A write-lock is an exclusive lock which allows only one system or process access to the information to perform actions on the information such as performing write operations.

Figure 7:
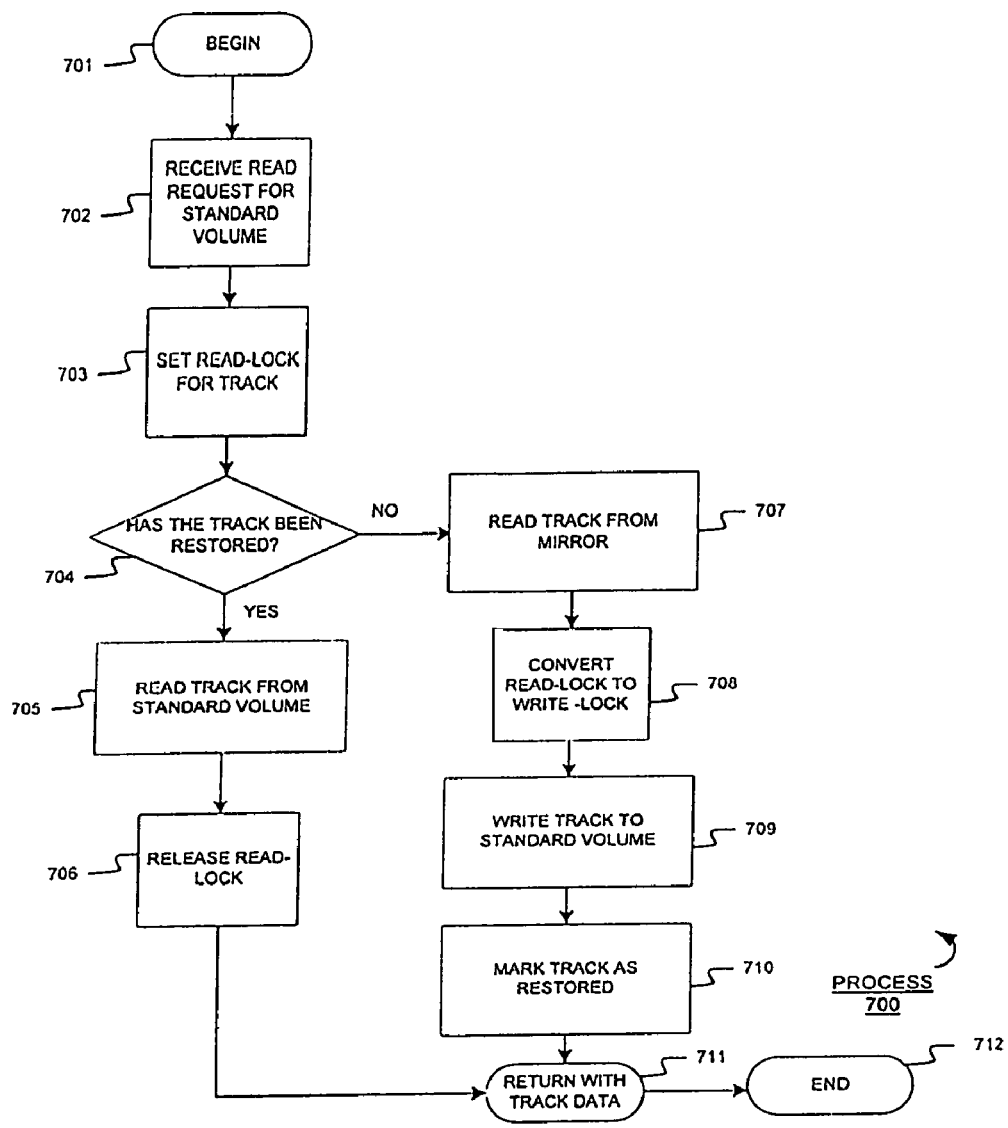
FIG. 7 shows a process for reading data from a standard volume in accordance with one embodiment of the invention.

FIG. 7 shows a process for reading data from a standard volume or mirror in accordance with one embodiment of the invention for use with a storage system using a read-lock and a write-lock. More particularly, process 700 performs a read from the standard volume if the data has been restored. If not, the data is read from the mirror and restored to the standard volume. At block 701, process 700 begins. At block 702, the process receives a request to read a track of the standard volume. At block 703, the process sets a read-lock for the requested track. As discussed above, a read-lock is a shared lock which allows multiple processes to read information, without allowing information to be updated. At block 704, the process determines whether or not the track has been restored. As discussed above, this determination may be performed by inspecting state information stored in a table such as that shown in FIG. 5. If the track has been restored to the standard volume, the track is read from the standard volume at block 705. After the track has been read, the read-lock is released at block 706 and the process returns the read track data.

If the track has not been restored, the track is read from the mirror instead of the standard volume at block 707. Information is read from the mirror because there is updated information on the mirror which is not available on the standard volume. At block 708, the read-lock set for the read track is converted to a write-lock to allow information to be written to the track of the standard volume. As discussed above, a write-lock is an exclusive lock that, when set, allows data to be written. At block 709, the process writes track information read from the mirror to the standard volume. At block 710, state information associated with the read track is marked in the table as having been restored. At block 711, the process returns with read track data. At block 712, process 700 ends.

It should be appreciated that other methods for reading data may be used, and the invention is not limited to the above implementation. For example, information may be stored by data storage parameters other than tracks. Also, data may be restored to the standard volume in a different sequence, or may be performed by a separate process.

Figure 8:
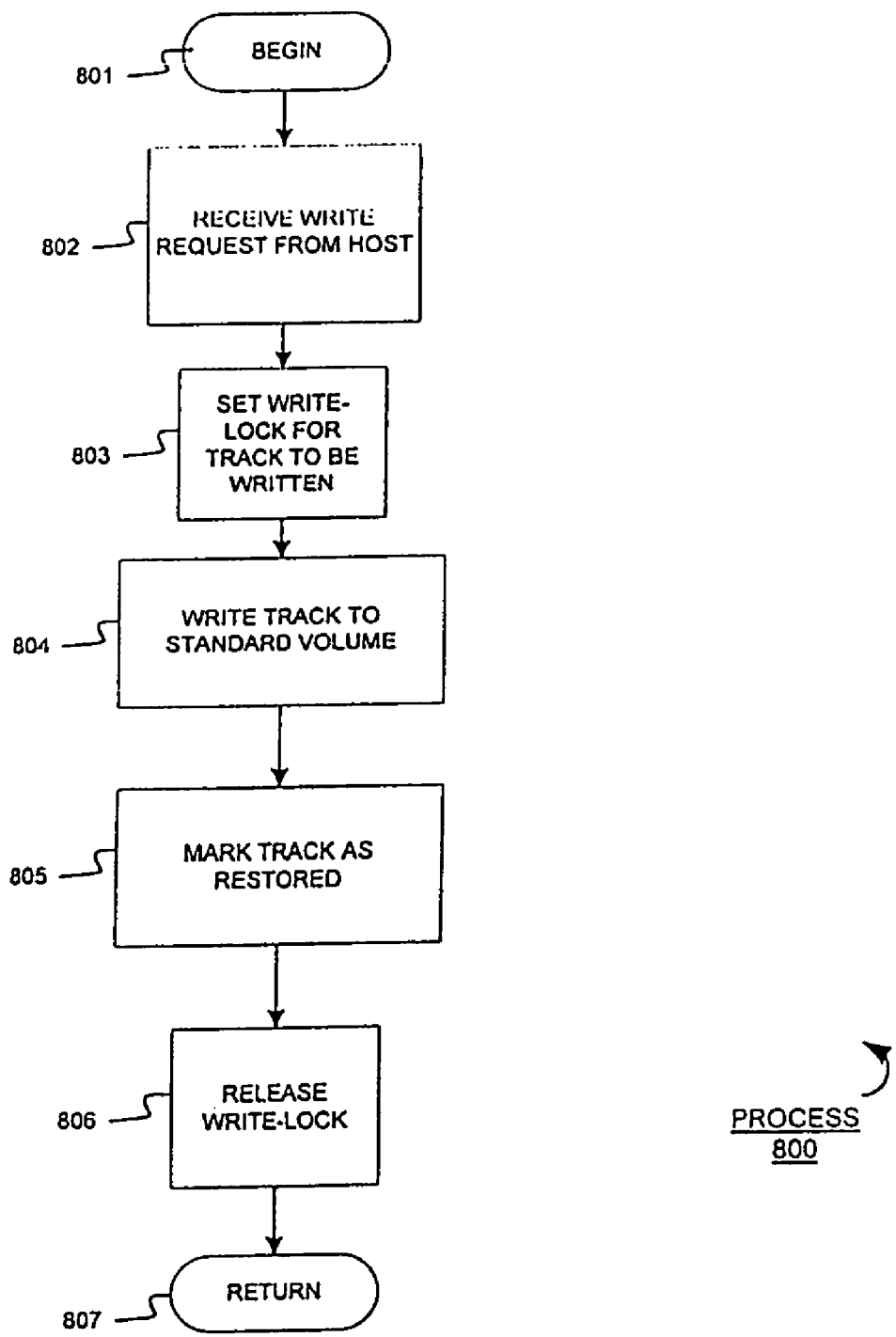
FIG. 8 shows a process for writing data to a standard volume in accordance with one embodiment of the invention.

FIG. 8 shows a process for writing data to a standard volume, but not its mirror, in accordance with one embodiment of the invention. At block 801, process 800 begins. At block 802, the process receives a write request from a host to write information to the standard volume. At block 803, the process sets a write-lock for the track of data to be written in the standard volume. At block 804, the track of data associated with a write command is written to the standard volume. At block 805, the process marks the track as being restored, e.g., by indicating that the track is restored within a table as discussed above with reference to FIG. 5. At block 806, the process releases the write-lock for the track. At block 807, process 800 returns.

It should be appreciated that other methods for writing data to a standard volume, but not its mirror may be used, and the invention is not limited to the above implementation.

Figure 9:
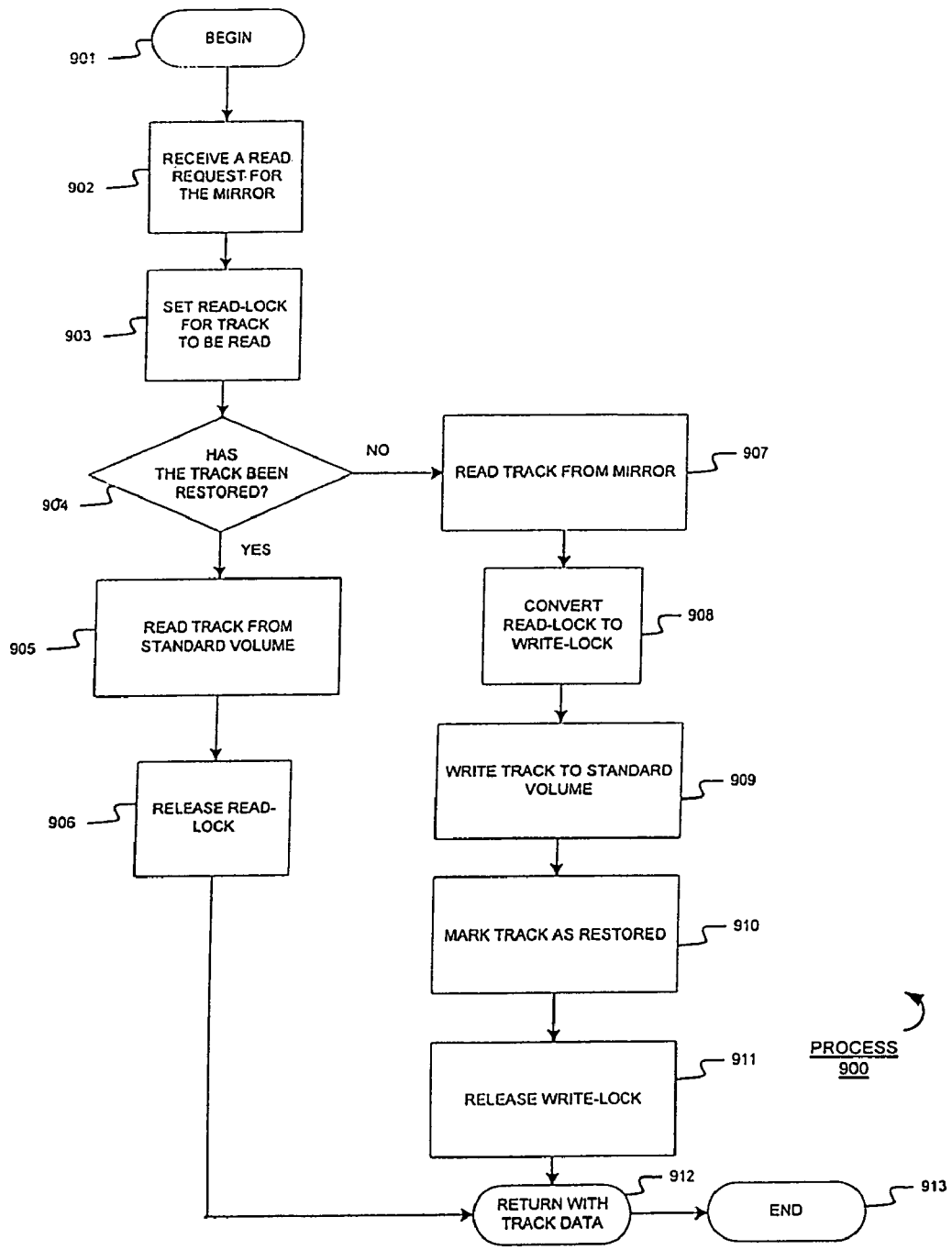
FIG. 9 shows a process for reading data from a mirror in accordance with one embodiment of the invention.

FIG. 9 shows a process for reading data from a mirror during a safe restore operation in accordance with one embodiment of the invention. As discussed, data may be read from a mirror and restored to the standard volume as part of a safe restore operation. At block 901, process 900 begins. Process 900 may be executed, for example, during a safe restore operation such that reads are satisfied from the mirror, and if the information to be read has not been previously restored from the standard volume, the information is restored to the standard volume. At block 902, the process receives a read request from a host. At block 903, the process sets the read-lock for the inspected track to be read. At block 904, the process determines whether the track has been restored to the standard volume. If so, the track is read from the standard volume at block 905. After the track has been read, the process releases the read-lock associated with the track, and the read track data is returned to the host at block 912.

If the track has not been restored to the standard volume, the track is read from the mirror at block 907 and the read-lock is converted to a write-lock at block 908. After the lock is converted, the track is written to the standard volume at block 909. At block 910, the track is marked as restored, e.g., changing a state stored in a table as discussed above with reference to FIG. 5. At block 911, the process releases the write-lock associated with the track. At block 912, the process returns the read track data. At block 913, process 900 ends.

It should be appreciated that other ways of reading data from a mirror and restoring the read information to a standard volume, and the invention is not limited to the above implementation. Other variations may be implemented. For example, reads may be satisfied from the mirror, and data may be destaged to the standard volume at a later time.

Figure 10:
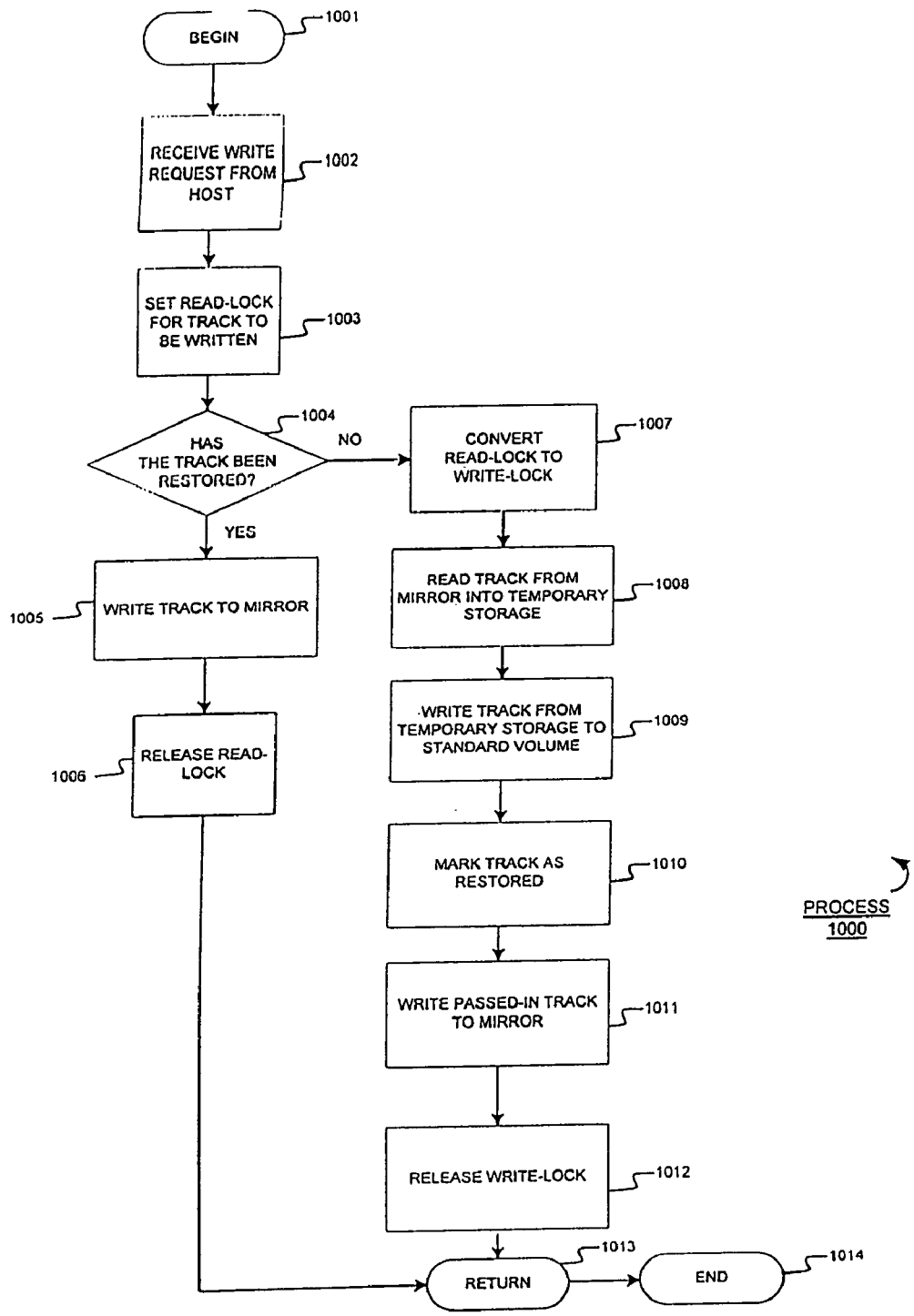
FIG. 10 shows a process for writing data to a mirror in accordance with one embodiment of the invention.

FIG. 10 shows a process for writing data to a mirror in accordance with one embodiment of the invention. More particularly, a process 1000 is provided wherein original data is written to a mirror, and according to whether a track has been restored to the standard volume, that original data is also written to the standard volume. A write to the mirror is performed, for example, when the mirror is in a split state, and updated information is written to the mirror. Data may be written to the split mirror, for example, when the mirror is used to perform data transactions with one or more hosts.

At block 1001 of FIG. 10, process 1000 begins. At block 1002, the process receives a write request to write information to the mirror. At block 1003, the process sets a read-lock for the track to be written to the mirror. At block 1004, the process determines whether or not the track has been restored to the standard volume. As discussed above, this determination may be performed by inspecting a table such as that shown in FIG. 5. If the track has been restored, the track is written to the mirror at block 1005. After the track has been written to the mirror, the read-lock is released at block 1006, and the process returns at block 1013. At block 1014, process 1000 ends.

If the track has not been processed, old data is first written to the standard volume. More particularly, at block 1007, the process converts the read-lock to a write-lock. At block 1008, the track is read from the mirror into a temporary storage. This temporary storage may be, for example, located in cache in storage system 201, a memory of adapter 204, or other storage location associated with storage system 201. At block 1009, track data stored in temporary storage is written to the standard volume. At block 1010, state information associated with the written track is marked in the table as having been restored. At block 1011, track information received from the host is written to the mirror. At block 1012, the process releases the write-lock, and at block 1013, process 1000 returns. In summary, process 1000 ensures that a restore is performed before writing to the mirror.

Figure 11:
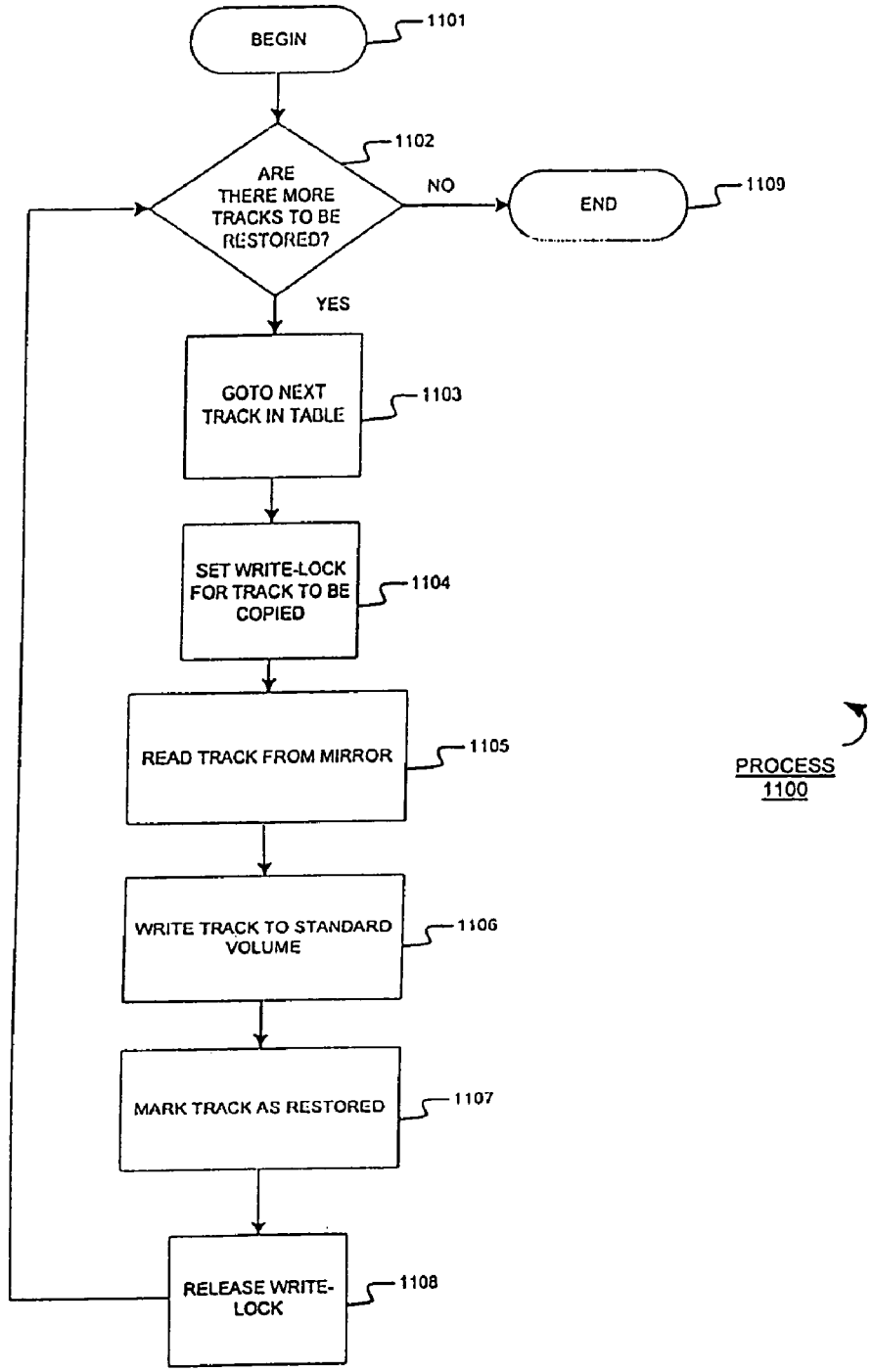
FIG. 11 shows a process for copying data in a background process in accordance with one embodiment of the invention.

FIG. 11 shows a process for copying data from a mirror in a split state to a standard volume to facilitate a safe restore in accordance with one embodiment of the invention. More particularly, a background copy process may be executed as part of a restore operation from the mirror to the standard volume. Conventionally, during copy operations performed as a result of a RESTORE or ESTABLISH command, a BCV is assigned as the next available mirror, and the BCV is synchronized to the standard volume. In accordance with one embodiment of the invention, a background copy operation is provided wherein the mirror is maintained in a split state during the copy operation rather than a synchronized state assumed by conventional systems.

At block 1101 of FIG. 11, process 1100 begins. At block 1102, the process determines if there are any more tracks to be restored. This determination may be made, for example, by inspecting a table such as that discussed above with reference to FIG. 5. If there are additional tracks to be processed, process 1100 proceeds to the next track to be copied in the table. At block 1104, the process sets a write-lock for the track to be copied. At block 1105, the process reads the track to be copied from the mirror device. At block 1106, the process writes the read track data to a device associated with the standard volume. At block 1107, a table entry corresponding to the written track is marked indicating the track was processed. At block 1108, the write-lock associated with the track is released. Process 1100 continues until there are no more tracks to be processed. When there are no more tracks to be processed, process 1100 ends at block 1109.

The invention is not limited to the above implementations, but may be implemented in many ways. For example, various aspects of the invention may be implemented in microcode of a controller of the storage system 201, such as a hardware bus adapter (HBA). Alternatively, various aspects of the invention may be implemented in other locations of storage system 201, within one or more hosts accessing storage system 201, or any computer having access to storage system 201. Further, it should be appreciated that although various aspects of the invention may be implemented in storage systems and their related components from EMC Corporation, any storage system may be used, and the invention is not limited thereto.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method for mirroring data of a first storage area, comprising:
   placing a second storage area in a first state, wherein the first state of the second storage area is a state in which updates to the first storage area are made to the second storage area;
   mirroring data from the first storage area to the second storage area while the second storage area is in the first state;
   changing a state of the second storage area from the first state to a second state in which updates to the first storage area are not made to the second storage area; and
   restoring data to the first storage area from the second storage area while maintaining the second storage area in the second state.

2. The method according to claim 1, further comprising writing, only to the first storage area, any data received during the act of restoring.

3. The method according to claim 1, further comprising maintaining, after the act of restoring is complete, the second storage area in the second state.

4. The method according to claim 1, further comprising;
   receiving a read request issued by a host; and
   reading, during the act of restoring, data from the second storage area in response to the read request when the data has not been restored to the first storage area.

5. The method according to claim 1, wherein the act of changing further comprises allowing the second storage area to be accessed independently from the first storage area.

6. The method according to claim 1, wherein the act of restoring includes performing an incremental restore of data from the second storage area to the first storage area.

7. The method according to claim 1, wherein the act of restoring includes performing a full restore of data from the second storage area to the first storage area.

8. The method according to claim 5, further comprising assigning an address to the second storage area, the second storage area being capable of being accessed through the address independently from an address of the first storage area.

9. The method according to claim 1, wherein the first storage area and second storage area are respectively located on first and second logical volumes of a storage system.

10. The method according to claim 1, further comprising indicating whether data has been restored to the first storage area from the second storage area.

11. The method according to claim 4, further comprising restoring data read from the second storage area to the first storage area.

12. The method according to claim 1, wherein at least one of the placing, mirroring, changing, and restoring acts is initiated by a command issued at a host computer.

13. A storage system comprising:
   a first storage area;
   a second storage area; and
   at least one controller that:
      places the second storage area in a first state, wherein the first state of the second storage area is a state in which updates to the first storage area are made to the second storage area;
      mirrors data from the first storage area to the second storage area while the second storage area is in the first state;
      changes a state of the second storage area from the first state to a second state in which updates to the first storage area are not made to the second storage area; and
      restores data to the first storage area from the second storage area while maintaining the second storage area in the second state.

14. The system according to claim 13, wherein the controller writes, only to the first storage area, any data received during restoring of data to the first storage area.

15. The system according to claim 13, wherein the controller maintains, after restoring of data to the first storage area is complete, the second storage area in the second state.

16. The system according to claim 13, wherein the controller receives a read request issued by a host, and the controller reads, during restoring of data to the first storage area, data from one of the first and second storage areas in response to the read request.

17. The system according to claim 13, wherein the controller allows the second storage area to be accessed independently from the first storage area.

18. The system according to claim 13, wherein the controller performs an incremental restore of data from the second storage area to the first storage area.

19. The system according to claim 13, wherein the controller performs a full restore of data from the second storage area to the first storage area.

20. The system according to claim 17, wherein the controller assigns an address to a disk device associated with the second storage area, the second storage area being capable of being accessed through the address independently from an address of the first storage area.

21. The system according to claim 13, wherein the first storage area and second storage area are located on first and second disk drives of a storage system, respectively.

22. The system according to claim 13, wherein the controller includes:
   means for placing the second storage area in the first state;
   means for mirroring data from the first storage area to the second storage area;
   means for changing the state of the second storage area from the first state to the second state; and
   means for restoring data to the first storage area from the second storage area while maintaining the second storage area in the second state.

23. A computer readable medium encoded with a computer program that, when executed on a computer system, causes the computer system to perform a method comprising acts of:
   placing a second storage area in a first state, wherein the first state of the second storage area is a state in which updates to the first storage area are made to the second storage area;
   mirroring data from the first storage area to the second storage area while the second storage area is in the first state;
   changing a state of the second storage area from the first state to a second state in which updates to the first storage area are not made to the second storage area; and restoring data to the first storage area from the second storage area while maintaining the second storage area in the second state.

24. The computer readable medium according to claim 23, the computer program being further adapted to cause the computer to perform writing, only to the first storage area, any data received during the act of restoring.

25. The computer readable medium according to claim 23, the computer program being further adapted to cause the computer to perform maintaining, after the act of restoring is complete, the second storage area in the second state.

26. The computer readable medium according to claim 23, the computer program being further adapted to cause the computer to perform receiving, at the storage system, a read request issued by a host; and
   reading, during the act of restoring, data from the second storage area in response to the read request if the data has not been restored to the first storage area.

27. The computer readable medium according to claim 23, wherein the act of changing further comprises allowing the second storage area to be accessed independently from the first storage area.

28. The computer readable medium according to claim 23, wherein the act of restoring includes performing an incremental restore of data from the second storage area to the first storage area.

29. The computer readable medium according to claim 23, wherein the act of restoring includes performing a full restore of data from the second storage area to the first storage area.

30. The computer readable medium according to claim 23, the computer program being further adapted to cause the computer to perform assigning an address to the second storage area, the second storage area being capable of being accessed through the address independently from an address of the first storage area.

31. The computer readable medium according to claim 23, wherein the first storage area and second storage area are respectively located on first and second logical volumes of a storage system.

32. The computer readable medium according to claim 23, the computer program being further adapted to cause the computer to perform indicating whether data, has been restored to the first storage area from the second storage area.

33. The computer readable medium according to claim 23, the computer program being further adapted to cause the computer to perform restoring data read from the second storage area to the first storage area.

34. The computer readable medium according to claim 23, wherein at least one of the placing, mirroring, changing, and restoring acts is initiated by a command issued at a host computer.

35. The computer readable medium according to claim 23, the computer program being further adapted to cause the computer to perform updating after the restoring act is complete, data within the first storage area;
   restoring, from the second storage area, data to replace the updated data within the first storage area.

* * * * *